United States Patent
Pope et al.

(10) Patent No.: US 6,869,729 B1
(45) Date of Patent: Mar. 22, 2005

(54) SINGLE COMPONENT SULFUR-BASED CATHODES FOR LITHIUM-ION BATTERIES

(76) Inventors: John Pope, 1166 N. 11th St., Laramie, WY (US) 82070; Dan Buttry, 1305 E. Custer St., Laramie, WY (US) 82070; Shannon White, 851 N. 5th St., Laramie, WY (US) 82070; Robert Corcoran, P.O. Box 3112, Laramie, WY (US) 82070

(*) Notice: Subject to any disclaimer, the term of this patent is extended or adjusted under 35 U.S.C. 154(b) by 0 days.

(21) Appl. No.: 09/890,529
(22) PCT Filed: Jan. 31, 2000
(86) PCT No.: PCT/US00/02445
§ 371 (c)(1),
(2), (4) Date: Apr. 5, 2002
(87) PCT Pub. No.: WO00/45451
PCT Pub. Date: Aug. 3, 2000

Related U.S. Application Data
(60) Provisional application No. 60/118,068, filed on Feb. 1, 1999.

(51) Int. Cl.$^7$ .............................................. H01M 4/60
(52) U.S. Cl. ..................................................... 429/213
(58) Field of Search ......................................... 429/213

(56) References Cited

U.S. PATENT DOCUMENTS

| | | | | |
|---|---|---|---|---|
| 4,472,488 A | * | 9/1984 | Maxfield et al. | 429/213 |
| 5,712,057 A | * | 1/1998 | Fauteux | 429/105 |
| 5,723,230 A | * | 3/1998 | Naoi et al. | 429/104 |

* cited by examiner

Primary Examiner—Carol Chaney
(74) Attorney, Agent, or Firm—William G. Ackerman

(57) ABSTRACT

The present invention pertains to the selection of cathode materials. The cathode materials of concern are the conducting polymer or backbone and the redox active species or sulfur species. The selection of the materials is based on the characteristics of the materials relating to the other components of the batteries and to each other. The present invention also pertains to the resultant cathode materials, particularly a selected cathode material of a single component sulfur-based conducting polymer with the sulfur species covalently linked to the conducting polymer, and most particularly a thiophene based polymer with covalently linked sulfur species. The conducting polymers have been covalently-derivatized with sulfides and/or sulfide-containing groups as battery cathode materials. The present invention also pertains to a battery employing the selection method and resultant cathode materials.

19 Claims, 6 Drawing Sheets

PDDT

PDPT

PDDT
PDPT

SINGLE COMPONENT SULFUR-BASED CATHODES FOR LITHIUM-ION BATTERIES

RELATED APPLICATIONS

This application claims priority to U.S. Provisional patent application 60/118,068, filed on Feb. 1, 1999 the contents of which are incorporated herein by reference in their entirety.

TECHNICAL FIELD

The present invention relates generally to cathodes for rechargeable batteries. More particularly, the present invention relates to cathode materials based on conducting polymers and sulfur or selenide species and the method of selecting conducting polymers and sulfur or selenide species. The selection method accounts for characteristics of the conducting polymer and the sulfur or selenide species and the specific capacity, capacity fade, charge and discharge rate, physical and chemical stability, safety and other characteristics associated with battery cycles. More particularly, the present invention relates to a single component sulfur-based conducting polymer for use in lithium batteries and the synthesis of such material.

BACKGROUND

Increasing reliance on sophisticated electronic technologies has exacerbated a need for reliable, portable sources of energy. The current worldwide market for rechargeable batteries exceeds $4 billion. However, an estimated $6 billion market in the United States alone remains untapped due to the inability of available products to meet the needs of a large industrial, consumer, and military based market. And the need is growing, particularly for high power applications such as electric vehicles and load-leveling equipment and weight or volume constrained applications such as portable computers, cellular phones, etc. Creative alternatives to current battery technologies must be developed.

Among available technologies, lithium and lithium-ion batteries represent the most promising technologies, especially in terms of their attractive energy densities when compared to nickel cadmium and nickel-metal hydride cells. This promise can be attributed in large part to the extremely high specific capacity available in theory from lithium (3862 A h/kg) and the reasonable charge capacity available from lithium-intercalated carbon (e.g. for $LiC_6$, 372 A h/kg) anodes.

However, realization of the full potential of that technology has been awaiting development of 1) electrolyte compositions able to withstand the high reactivities of those anodes, and 2) inexpensive, stable cathodic materials also able to store high charge capacities. The present invention addresses resolution of the latter issue.

Batteries currently marketed utilize $LiCoO_2$ cathodes, a material that has a theoretical specific capacity of 274 A h/kg and a practical specific capacity of 100 to 150 A h/kg. In realistic terms, then, cells using $LiCoO_2$ can utilize only one-thirtieth of the potential energy per gram stored in lithium metal (or only one-third of the potential energy per gram stored in $LiC_6$). While batteries based on such cathodes are suitable to meet short-term commercial needs, significant progress in this area must be based around developing cathodes with specific capacities similar to those of the best available anodes.

In terms of alternative cathode materials being currently studied, sulfur and sulfur-containing compounds offer the best opportunities in terms of high theoretical specific capacities. Sulfur cathodes operate by storing energy as disulfide bridges, a very stable oxidized material, then releasing it by reducing to thiolate moieties. This process is illustrated in FIG. 1 for one material. While sulfur cathodes were the first employed for lithium laboratory cells, their use in practical batteries was abandoned primarily due to the insulating nature of those materials, which necessitates using high temperatures in order to facilitate mass transport within the cathodes.

However, advances in understanding and controlling electronic conductivity in composite materials has signaled a revival of that class of materials, as evidenced by ongoing exploratory or commercial efforts. Experimental lithium metal and lithium ion anode prototypes of systems recently developed match or exceed current room temperature secondary battery performances in terms of gravimetric energy density (energy delivered per mass of the cathode material).

In U.S. Pat. No. 5,789,108, Chu is pursuing technology based on cathodes composed of inorganic sulfur mixed with poly(ethylene oxide) (PEO), lithium salts, and carbon powders, while Skotheim et al. in U.S. Pat. No. 5,529,860, are developing cathodes based on inorganic sulfur and poly(acetylene) derivatives. Those formulations represent attempts at achieving electronic and ionic access to the sulfur in those cathode via dispersion in an ionically conducting medium (PEO) which contains an electronic conductor (carbon)(Chu) or the use of a conducting polymer to effect both goals (Skotheim et al.).

Although such materials show excellent specific capacities during initial cycles, neither Chu nor Skotheim et al. have commercialized a sulfur or organosulfur based secondary battery due to high capacity loss, or "fade," observed for their cells over multiple charge and discharge cycles. Consideration of the possible origins of that behavior are obscured by a general lack of knowledge regarding the complicated electrochemistry of inorganic sulfur, compounded by the varying solubilities and chemical activities of the different forms of sulfur (e.g. polysulfide, oligosulfide, dimer, monomer ($S^{2-}$)), possible reaction between those species and the anode, and the likely growth of heterogeneous zones of non-conductive material that separate from the initial cathode mixture.

However, it is clear from recent work that the capacity fade observed is due in large part to diffusion of monomeric sulfur species out of the cathode. While interesting redox chemistry is typically evident in the first few cycles, it typically fades after several cycles to leave less desirable redox activity—viz. the organosulfur or sulfur or selenide component exits the cathode via dissolution into the electrolyte film, resulting in capacity loss during cycling.

In WO 99/03162, Skotheim et al. describe a polymer film that protects the lithium anode in a secondary battery. The film interferes to some degree with the reactions and thus reduces the overall efficiency of the battery. The film is needed when sulfur species are mobile and may migrate to the anode. Skotheim et al. do not suggest decreasing or eliminating the mobility of reactive sulfur species so that interference at the anode is decreased and thereby the efficiency of the battery is increased.

Definitions

Conducting Polymer:

Conducting polymers are polymers through which electrons can move from one end of the polymer to the other. A conducting polymer transports voltage and/or current along its backbone or between its chains by changing the distribution of electrons in the polymer chain. Such conduction typically occurs through conjugated 7 electronic functionalities, although some conducting polymers include other types of electronic functionalities. In some instances, conductivity occurs in short chains of the polymer ("oligomers"). In some cases, conductivity occurs in long chains of the polymer. Non-limiting examples of conducting polymers include poly(acetylene), poly(aniline), poly (pyrrole), poly(thiophene), poly(p-phenylene). (poly) phthalocyanine. etc. and derivatives thereof.

Redox Species:

A redox species is an atom, molecule, or macromolecule that accepts or releases one or more electrons when placed under an electric field of appropriate direction and magnitude. Non-limiting examples of redox species include ruthenium hexamine chloride, ferrocene, gold, poly(pyrrole), hexanethiol, and similar species and derivatives.

Battery:

A battery is comprised of one or more cells each comprised of an electropositive anode such as lithium or nickel, an electronegative cathode such as metal oxide, sulfur, or cadmium, and an ionically-conducting separator, Such as poly(ethylene oxide), propylene carbonate, or Nafion, that contain an electrolytic salt such as lithium hexafluorophosphate, sodium chloride, etc. A cell "discharges" by allowing electrons to pass via an external circuit from a higher energy state in the anode to a lower energy state in the cathode while allowing ions to pass through the separator. In lithium-based cells. Li ions pass from the anode through the separator to the cathode. The electrons that pass through the external circuit may be used to perform work. In a rechargeable battery, this electron and ion movement may be reversed to some extent by applying an external current to the cell to "charge" the cell. The typical forms of batteries, and more specifically of lithium-based batteries are well known to those skilled in the art.

Sulfur Species:

In this document, sulfur species include atoms, molecules, and macromolecules that contain at least one sulfur atom. Typical terms used to describe such molecules include organosulfur, sulfur, sulfide, disulfide, thio, thiol, thiolate, mercapto, mercaptan etc. In some cases, the sulfur species contains a negatively-charged or proton-associated sulfur atom that is covalently bound to another atom through a single bond. This type of sulfur species is capable of releasing an associated cation or proton and forming a disulfide bond with a similar atom. In other cases, the sulfur species contains sulfur atoms that are multiply bound to other atom or atoms and are not capable of forming disulfide bonds. In all cases, in this document, sulfur species refers to atoms, molecules, and macromolecules that contain at least one sulfur atom that can act in part or in whole as a redox species.

Selenium Species

In this document, selenium species include atoms, molecules, and macromolecules that contain at least one selenium atom. Typical terms used to describe such molecules include selenide, selenate, diselenides, etc. In some cases, the selenide species contains a negatively-charged or proton-associated selenide atom that is covalently bound to another atom through a single bond. This type of selenide species is capable of releasing an associated cation or proton and forming a diselenide bond with a similar atom. In other cases, the selenide species contains selenide atoms that are multiply bound to other atom or atoms and are not capable of forming diselenide bonds. In all cases, in this document, selenide species refers to atoms, molecules, and macromolecules that contain at least one selenide atom that can act in part or in whole as a redox species.

SUMMARY OF INVENTION

One aspect of the present invention pertains to the selection of cathode materials. The cathode materials of concern are the conducting polymer or backbone and the redox active species or sulfur species. The selection of the materials is based on the characteristics of the materials relating to the other components of the batteries and to each other.

In one embodiment, the selection of cathode materials is based on one or more of the following characteristics of the conducting polymer and/or the sulfur or selenide species: ease of fabrication using straightforward synthetic procedures; ionically conductive for $Li^+$ ions; no labile protons in the material: a high density of electroactive species per weight and volume (i.e. large inherent charge capacity); good overlap of the thermodynamic redox potentials of the electroactive substituents and the conducting polymer backbone; reasonable electronic conductivity of the composite: no solubility in typical electrolyte solutions; and electrochemically, physically, and chemically stable to many repeated charge and discharge cycles. In a preferred embodiment, the selection of the cathode materials is based on all of the above identified characteristics for both the conducting polymer and the sulfur or selenide species.

In one embodiment, the selection of cathode materials is based on the overlap of the thermodynamic potentials of the electroactive substituents of the sulfur species and the conducting polymer. The cathode materials are chosen based on the redox mediation window. The conducting polymer mediates electrons between the current collector and the sulfur or selenium species. Conducting polymers exhibit potential-dependent conductivities. When the potential is in the "double-layer" region of the conducting polymer (that is, when the conducting polymer is releasing or accepting electrons), the conductivity of the polymer is much higher than when the potential is more negative or more positive of that region. If the conducting polymer is inherently in a less-conductive state in the potential region where the sulfur or selenium species exhibits redox species behavior, mediation of electrons between the current collector and the sulfur or selenium species is poorly effected, the material is less desirable, and the battery performance is poorer.

In a preferred embodiment, the resulting premise of the selection process of materials is that the redox active species or sulfur species that are mobile are not compatible with long-life, high-capacity batteries.

Another aspect of the present invention pertains to resultant cathode materials identified by the use of the selection process identified above.

In a preferred embodiment, the cathode materials were selected because they exhibit overlap of the thermodynamic potentials of the electroactive substituents of the sulfur species and the conducting polymer. The cathode materials form a redox mediation window. The conducting polymer mediates electrons between electrode(s) and the sulfur species in an effective fashion.

In a preferred embodiment, the sulfur species is NOT covalently linked to the conducting polymer backbone. An example of this system is that comprising a mixture of poly(3,4-ethylenedioxythiophene) (PEDT) and 2,5-dimercapto-1,3,4-thiadiazole, dilithium salt ($Li_2DMcT$). PEDT is available as an aqueous dispersion. $Li_2DMcT$ is dissolved directly into the PEDT dispersion at high concentrations. Properly treated films cast from that mixture are used as cathode materials in lithium and lithium-ion cells. Alternately, films are prepared by electrochemical or chemical oxidation of the PEDT monomer and $Li_2DMcT$ from the same or different solutions in a homogeneous or layered arrangement. Li$_2$DMcT contains no labile protons, so its use in the cathode is attractive. PEDT has a wide potential window of conductivity, contains no labile protons, and is not proton-doped, so its use in the cathode is attractive.

One embodiment of the present invention is the cathode materials are not mobile. Specifically, the redox active species or sulfur species is not mobile. The redox active species is bound to the conducting polymer and is not able to migrate from the conducting polymer.

In a preferred embodiment, the cathode material is a single component sulfur-based conducting polymer with the sulfur species covalently linked to the conducting polymer. The link of the sulfur species and the conducting polymer provides suitable fade characteristics by not allowing the sulfur species to be soluble in the electrolyte. In this preferred embodiment, sulfur or other sulfur species apart from the covalently linked sulfur species may or may not be present. Most preferably the cathode material contains no other sulfur or sulfur species apart from the bound sulfur species.

In a preferred embodiment, the cathode material is a thiophene based polymer with covalently linked sulfur species. Such conducting polymers have been covalently-derivatized with sulfides and/or sulfide-containing groups and employed as battery cathode materials. Physical constraints of the conducting polymer and sulfide components via covalent bonds which are present regardless of charge state of the cathode represents a novel step in the field.

Yet another aspect of the present invention pertains to a method of synthesis of the selected cathode material.

Still another aspect of the present invention pertains to batteries which comprise an anode: cathode material(s) of the present invention, as described herein; and a separator between the anode and the cathode materials

DETAILED DESCRIPTION OF INVENTION

Figure 1:
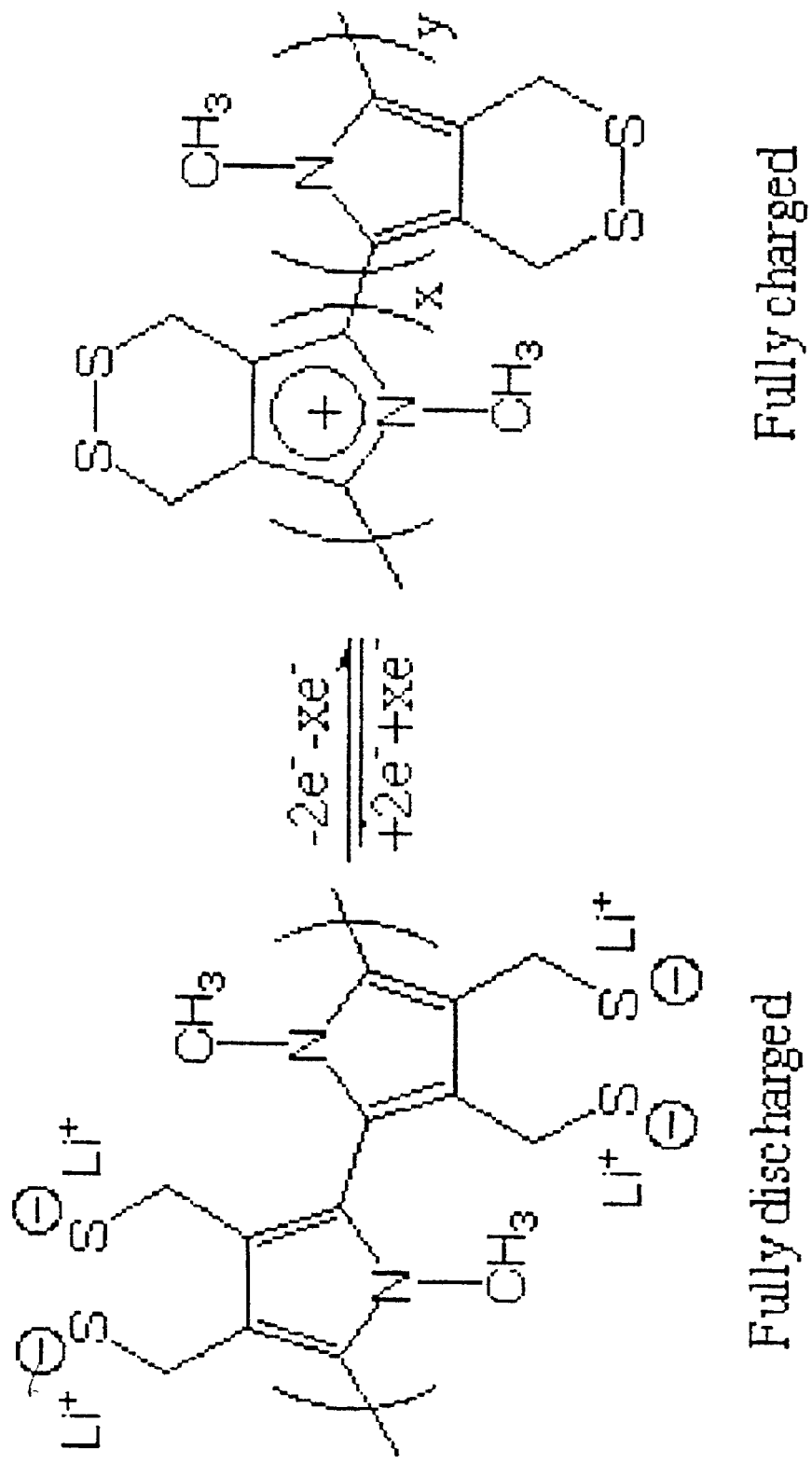
FIG. 1 shows a sulfur cathode in operation by storing energy as a disulfide bridge then releasing it by reducing to thiolate moieties.

One aspect of the present invention pertains to the selection of cathode materials. The cathode materials of concern are the conducting polymer or backbone and the redox active species or sulfur species. The selection of the materials is based on the characteristics of the materials relating to the other components of the batteries and to each other.

In one embodiment, the selection of cathode materials is based on one or more of the following characteristics of the conducting polymer and/or the sulfur species: ease of fabrication using straightforward synthetic procedures; ionically conductive for Li$^+$ ions; no labile protons in the material, a high density of electroactive species per weight and volume; good overlap of the thermodynamic potentials of the electroactive substituents and conducting polymer backbone; reasonable electronic conductivity of the composite; no solubility in typical electrolyte solutions; and electrochemically stable to many repeated charge and discharge cycles. In a preferred embodiment, the selection of the cathode materials is based on all of the above identified characteristics for both the conducting polymer and the sulfur species.

Molecular Design of Innovative Sulfur-Based Cathode Materials

The chemical and physical constraints imposed on cathode materials are substantial. The specific properties required include ease of fabrication using straightforward synthetic procedures.

In sulfur-based batteries, the sulfur species and preferably the conducting polymer must be ionically conductive for Li$^+$ ions. The chemistry of sulfur-based batteries necessitates the requirement of the cathode materials to be ionically conductive for Li$^+$ ions.

A material that contains mobile redox species presents stability, capacity fade, and safety problems when used as a cathode material in a lithium or lithium-ion or lithium polymer cell. For example, 2,5-dimercapto-1,3,4-thiadiazole contains two labile protons. Use of that material as a component of a cathode material leads to transport of the labile protons via intermediate species into the electrolyte and eventually to the anode, where spontaneous electrochemical reduction by the anode creates hydrogen gas. Similar events can occur when poly(aniline), a proton-doped conducting polymer, is used as a component of a cathode material. This constraint includes the selection of conducting polymers and sulfur species that do not contain labile protons at any stage of the battery reaction.

A battery's effectiveness is attributable to the charge capacity. Selecting a sulfur species and conducting polymer with a high density of electroactive species per weight and volume (i.e. large inherent charge capacity) increases the effectiveness of the cathode and battery overall.

A battery's effectiveness is also dependent on the electronic conductivity of the cathode materials. Selecting a sulfur species and conducting polymer with an electronic conductivity above 10$^{-6}$ S/cm, more preferably above 10$^{-5}$ S/cm, more preferably above 10$^{-4}$ S/cm, more preferably above 10$^{-3}$ S/cm, and most preferably above 10$^{-2}$ S/cm increases a battery's effectiveness.

The solubility of the sulfur species or conducting polymer in the electrolyte inhibits the efficiency of the battery. When sulfur species or other electroactive species associated with the conducting polymer are mobile in the electrolyte, the species may migrate towards the anode and a decrease in efficiency results when the species contact the anode. Over time the anode increasingly becomes contacted with species and a loss of electroactive sites may be seen on the anode. The solubility of the sulfur species also leads to collection of the active sulfur away from the conducting polymer and therefore a loss of redox species in the cathode. Thus, selecting sulfur species and conducting polymers which are not soluble in the electrolyte solution increases the efficiency of the battery and reduces the fade and poor cyclability typical of sulfur-based batteries.

The current sulfur-based batteries in use exhibit considerable fade over even 100 cycles. Many factors contribute to the fade observed in conventional sulfur-based batteries. However, by selecting the conducting polymer and sulfur species of the cathode materials that are electrochemically stable to many repeated charge and discharge cycles the fade is reduced.

Unfortunately, previous sulfur-based cathodes have not satisfied most of these requirements. However, understanding the structure-function relationships for these materials allows sufficient tailoring of their properties to increase their effectiveness in rechargeable batteries. X Redox Mediation Window In one embodiment, the selection of cathode materials is based on the overlap of the thermodynamic potentials of the electroactive substituents of the sulfur species and the conducting polymer. The cathode materials are chosen based on the redox mediation window. The conducting polymer mediates electrons between electrode and sulfur species.

Figure 3:
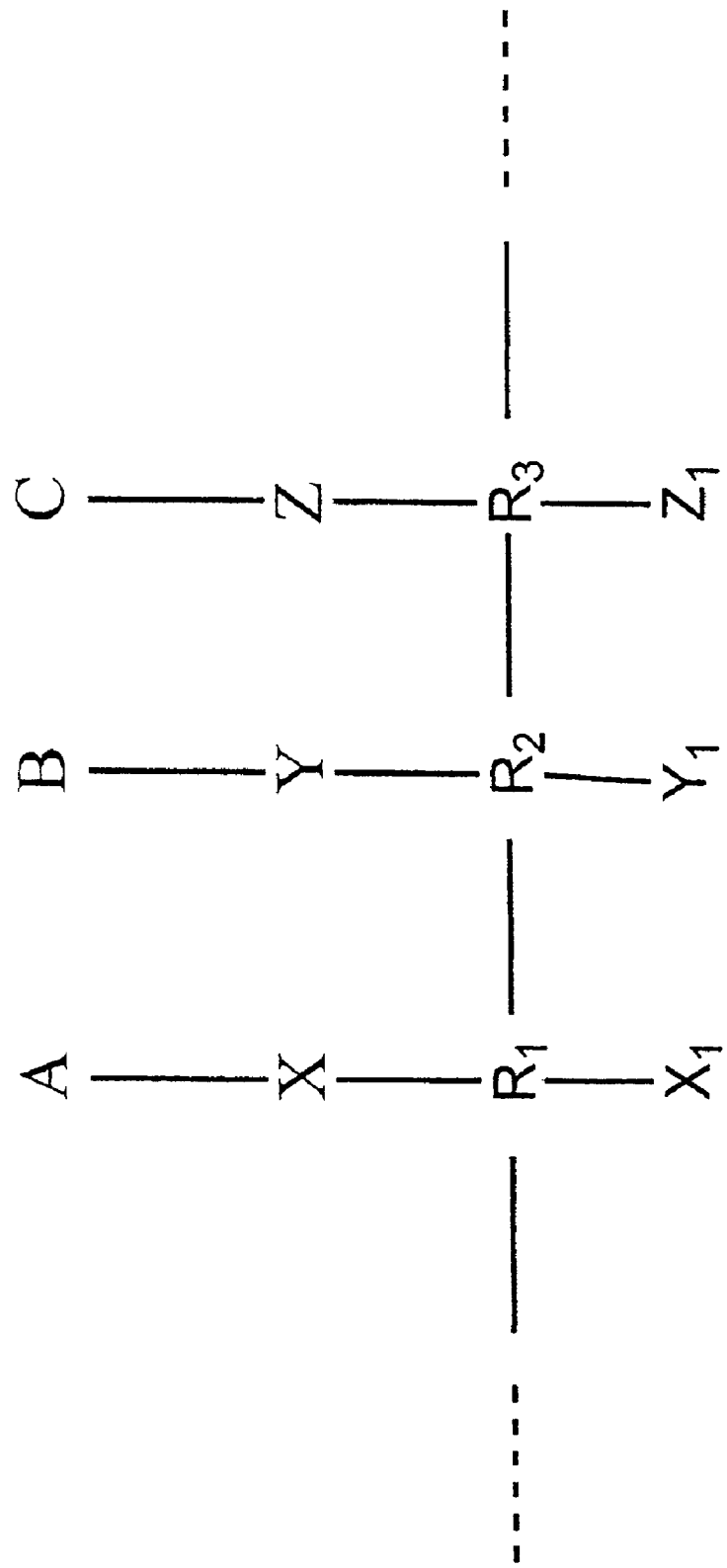
FIG. 3 shows a general formula of a conducting polymer of the present invention.

An example of inappropriate overlap of thermodynamic potentials, the redox response of composite cathode components are shown in FIG. 3. While oxidation of the organosulfur occurs when the polyaniline is primarily in its metallic state (indicated by a dashed line at 3.1 V), reduction of the resulting disulfide occurs in a potential window where the polyaniline is primarily in its insulating state (indicated by a dashed line at 2.6 V). The practical consequences of that thermodynamic mismatch between components is apparent in devices using such cathodes—charging of the cells occurs quickly, but discharging is slow and typically incomplete.

Cathode Materials

Another aspect of the present invention pertains to resultant cathode materials identified by the use of the selection process of the present invention.

In a preferred embodiment, the cathode materials were selected because they exhibit overlap of the thermodynamic potentials of the electroactive substituents of the sulfur species and the conducting polymer. The cathode materials form a redox mediation window. The conducting polymer mediates electrons between electrode(s) and the sulfur species.

In a preferred embodiment, the resulting premise of the selection process of materials is the redox active species or sulfur species that are mobile are not compatible with long-life, high-capacity batteries. The sulfur species in the cathode materials is not mobile and is not soluble in the electrolyte of the battery and does not include labile protons that are mobile or soluble in the electrolyte. More preferentially, the cathode materials are not mobile. Specifically, the redox active species or sulfur species is not mobile. The redox active species is bound to the conducting polymer and is not able to migrate from the conducting polymer.

In a preferred embodiment the cathode material is a single component sulfur-based conducting polymer with the sulfur species covalently linked to the conducting polymer. The link of the sulfur species and the conducting polymer provides suitable fade characteristics by not allowing the sulfur species to be soluble in the electrolyte. In this preferred embodiment, sulfur or other sulfur species in the cathode apart from the covalently linked sulfur species may or may not be present. Most preferably the cathode material contains no other sulfur or sulfur species apart from the bound sulfur species.

In a preferred embodiment, the cathode material is a thiophene based polymer (such as polythiophene) with covalently linked sulfur species. Such conducting polymers have been covalently-derivatized with sulfides and/or sulfide-containing groups as battery cathode materials. Physical constraints of the conducting polymer and sulfide components via covalent bonds which are present regardless of charge state of the cathode represents a novel step in the field.

Using the method of the present invention a resultant cathode material was identified. Sulfur-derivatized conducting polymers based on the oxide-substituted poly(thiophene) backbone are synthesized. Those polymers show good thermodynamic overlap with sulfide oxidation and reduction (i.e. charge and discharge). Covalent linkage of the sulfur groups to the backbone provides molecular-level ordering of the material, effecting homogeneous conductivity, cycling stability, and physical structure of the cathode.

In one embodiment, the sulfur-derivatized conducting polymers have the general formula $(R_i)_n(Y_jA_k)_m$ where R is monomer or oligomer units of a conducting polymer, i is 1 to n and n is greater than 20, more preferably greater than 100, more preferably greater than 1000, more preferably greater than i 10,000 and most preferably greater than 100,000: Y is a functionalizing group that provides additional physical or chemical properties to the conducting polymer and j is 0 to n; A is a sulfur species, k is 1 to n and m is 1 to 12. A simplified representation of the general formula is shown in FIG. 3.

Figure 4:
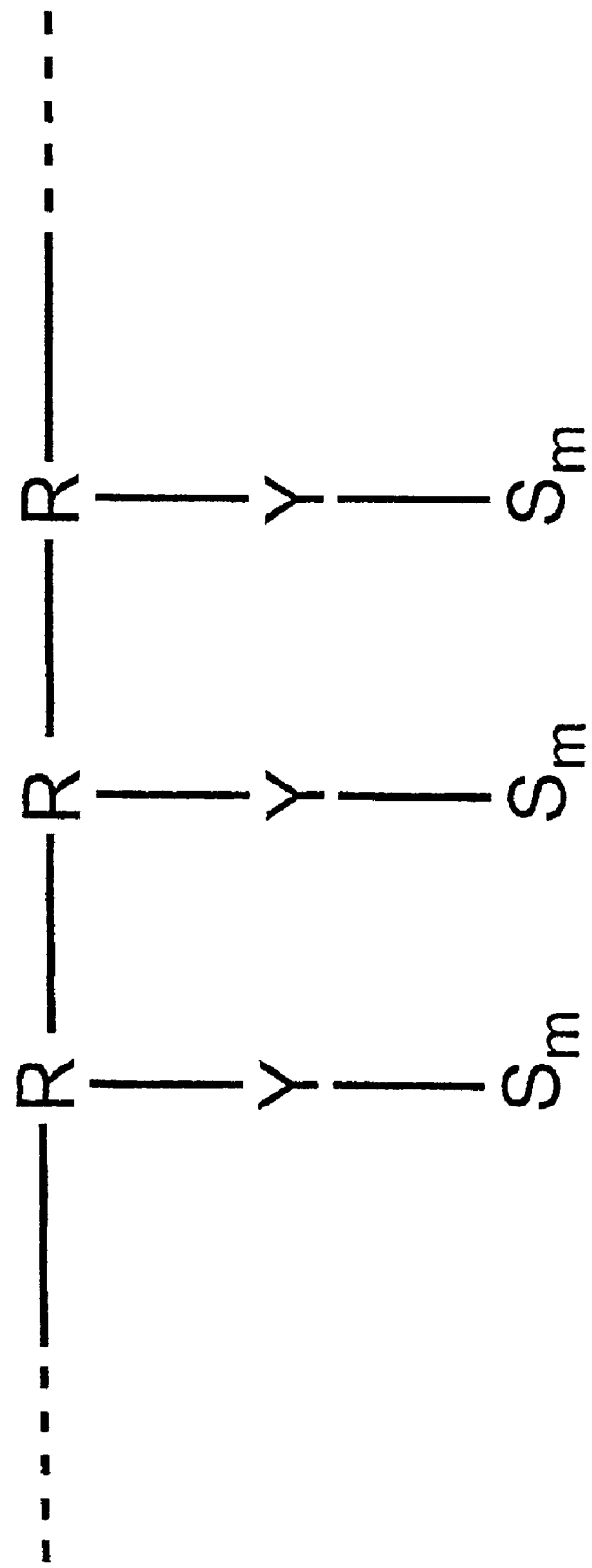
FIG. 4 shows a more specific formula of the present invention.
Figure 5:
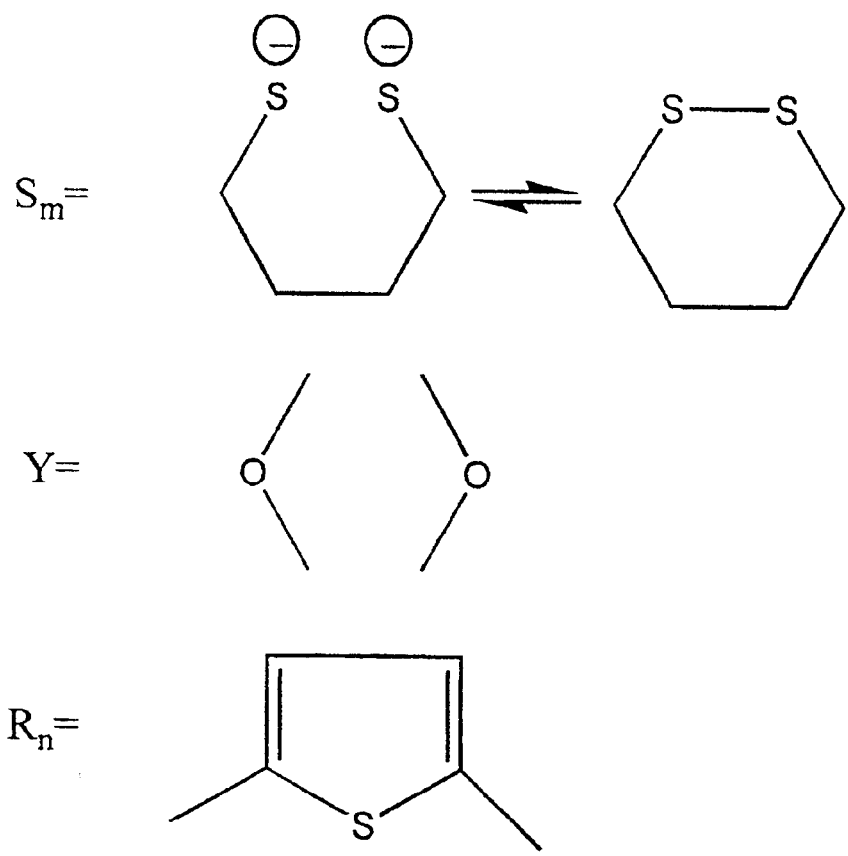
FIG. 5 shows the substituent parts of the polythiophene conducting polymer.

More particularly, the sulfur-derivatized conducting polymers have the general formula $(R)_n(YS_m)_x$ where R is a conducting polymer backbone and n is greater than 20, more preferably greater than 100, more preferably greater than 1000, more preferably greater than 10,000 and most preferably greater than 100,000; Y is a functionalizing group; S is an organosulfur moiety, m is 1 to 12 and x is 1 to 4. In a preferred embodiment R is polythiophene or its derivatives. The formula is shown in FIG. 4. The preferred embodiment is shown in FIG. 5 based on the polythiophene backbone $R_n$.

Specifically, the present invention also concerns covalently derivatizing an electronically conducting polymer with a high density of electroactive sulfur species. The materials operate near the high oxidation potentials exhibited by the more common metal oxide cathodes but show far better ionic conductivity. This is accomplished by applying pre-existing, high yield organic synthesis procedures to the formation of monomeric, and then polymeric species composed of thiophene-based polymer chains with thiolate substituents. The synthesis steps are geared toward forming a reasonably high molecular weight polymer while at the same time incorporating a high density of electroactive species that are not only electrochemically stable, but also protect the polymer from chemical degradation.

Another aspect of the present invention pertains to a method of designing conducting polymers covalently-derivatized with sulfur species such that the chemical, physical, and electrochemical properties of the designed material are advantageous to use in a rechargeable cell. For example, for the conducting polymers represented by FIG. 6, the number of carbon atoms between the oxygen atoms and the sulfide-containing six-membered ring are varied to affect both the proximity of the sulfide-containing six-membered ring to the conducting polymer backbone and the flexibility of the attachment of the sulfide-containing six-membered ring. Likewise, other atom or functional groups such as sulfur, selenium, amides, amines, etc. are substituted for the oxygen atoms in order to affect the conductivity and relative energy of the conducting polymer backbone. Furthermore, the number of carbon atoms in the sulfide-containing six-membered ring are reduced or increased in order to affect the electronic, physical, or chemical properties of the sulfur atoms. For instance, reducing the number of carbon atoms to produce a sulfide-containing four-membered ring causes additional strain on the disulfide oxidation product and results in higher potentials for redox activity of that sulfur species. Finally, additional substituents are placed on the conducting polymer ring, functionalizing group, or sulfur species in order to affect the chemical and physical properties of the material. For instance, attaching a alkylsulfonate at the carbon atom above the oxygen atom increases the solubility and miscibility of the material.

Yet another aspect of the present invention pertains to a method of synthesis of the selected cathode material.

Still another aspect of the present invention pertains to batteries which comprise an anode, cathode material(s) of the present invention, as described herein, and a separator between the anode and the cathode materials. A battery with the cathode material as sulfur-derivatized conducting polymers based on the oxide-substituted poly(thiophene) backbone are used as a substitute cathode in existing lithium, lithium-ion, and lithium polymer rechargeable batteries.

Synthesis of Sulfur-Derivatized Cathode Materials.

Thiophene Based Cathode Materials

Figure 6:
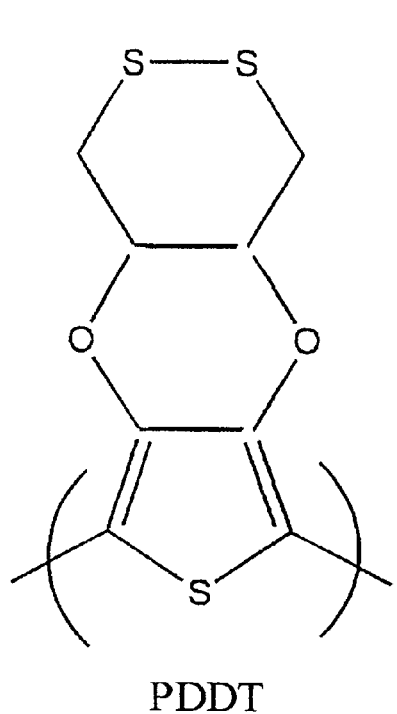
FIG. 6 shows two resultant conducting polymers of the present invention.
Figure 6:
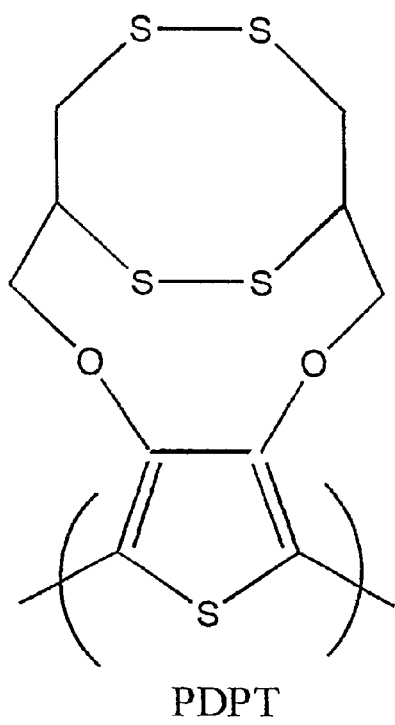

Two thiophene-based polymers, structures shown in FIG. 6, were synthesized. The first (PDDT) follows a tractable route to produce a material with an attractive theoretical specific capacity (235 A h/kg). Synthesis of the second polymer (PDPT) was more uncertain due to its bulky substituents, yet its synthesis yielded a material with a very attractive theoretical specific capacity (332 A h/kg).

PDDT was chosen as a cathode material in part because a stable 6-member ring is formed during oxidation to the disulfide.

PDPT, shown in FIG. 6, offers higher specific capacity because of the increased number of disulfide substituents Development of Deposition Techniques for the Polymers Synthesized Processing of conducting polymers is a non-trivial issue—the very traits that make those materials conductive also result in low solubility of the polymers in most solvent systems. That problem is compounded for the systems described herein by the typically poor solubility of sulfide species.

For a preferred embodiment, if a particular polymer exhibits some solubility in a given, non-protic solvent such as N-methylpyrrolidinone or methylene chloride, then a saturated solution is directly cast onto the current collector. Care was taken to generate uniformly small particle sizes of the polymer prior to deposition. Evaporation of the solvent under normal drying conditions leads to a relatively adherent film due to the soluble phase acting as a binder. If a quality film is generated, but adhesion to the current collector is poor, then the current collector is chemically or mechanically treated prior to film deposition.

For another embodiment, mechanical or high pressure or temperature methods are employed to prepare suitable films of the cathode material. For example, extrusion, heat-pressing, and other methods are available.

In a preferred embodiment, the derivatized conducting polymer is prepared by chemical or electrochemical oxidation of its monomer in the presence of a suitable current collector. For example, the monomer of PDDT (FIG. 6) is electrochemically oxidized at a stainless steel electrode by applying a potential of more than one volt versus the Ag/AgCl reference redox couple. This application results in the preparation of a film of PDDT on the stainless steel suitable for use as a cathode material.

If a particular polymer is not sufficiently soluble in any appropriate solvent system, and if the mechanical preparation of reasonable films is not possible, carbon paste electrodes containing the polymers are prepared in order to allow electrochemical testing of their properties.

Example 1

The first attempted, unsuccessful, synthesis involved Cu(I) assisted nucleophilic displacement of the bromine groups of 3,4-dibromothiophene with 1,2-dithiane-4,5-diol to form the desired cyclic ester (Scheme 1).

Experimental:

3,4-(1,2-dithiane-4,5-diol) Thiophene. Pyridine (5 mL) was added to 1,2-dithiane-4,5-diol (0.27 g. 1.80 mmol). CuI (0.01 g. 0.07 mmol) and KO$^t$Bu (0.06 g. 0.54 mmol) to produce a yellow solution which turned green after stirring at ambient temperature over a period of 1 h. 3,4-dibromothiophene (0.09 g, 0.36 mmol) was then added to the reaction mixture which was heated at 100° C. for 24 h. A distillation was then done to remove pyridine. The remaining solution was dissolved in 0.05 M EDTA to remove complexed copper. An extraction was done with ethyl acetate. The organic, ethyl acetate, layer was concentrated under vacuum. This procedure did NOT result in the desired compound, the actual identity of the remaining solution was not confirmed.

At this point a new synthetic procedure was devised (Scheme 2) utilizing 3,4-dihydroxythiophene. 3,4-dihydroxythiophene can be synthesized by adding 2,2'-thiobisacetate ethyl ester to diethyl oxalate in a solution of ethanol and sodium metal, according to the method of Hinsberg, to produce 3,4-dihydroxy-2,5-dicarbethoxythiophene, compound A in Scheme 3. Hydrolysis of compound A with ethanolic sodium hydroxide results in a dicarboxylic acid, compound B. Heating compound B under a reduced atmosphere causes sublimation of compound C as a yellow powder. Care must be taken in isolation because compound C decomposes readily on exposure to heat, light and moisture. Alternatively, a more direct approach toward the formation of 3,4-dihydroxythiophene is to add BS and a base, or simply $S^{2-}$, to 1,4-dibromo-2,3-butanedione. Once 3,4-dihydroxythiophene was obtained it was reacted with 2 equivalents of ethyl bromoacetate under basic conditions to form compound D which when treated with 2 equivalents of LDA in the presence of $I_2$ or another oxidizing agent formed compound F. Alternatively, compound F can be synthesized by adding 3,4-dihydroxythiophene to a cyclic sulfate ethyl ester, compound E, in the presence of potassium tert-butoxide at elevated temperatures. Upon reduction of F with $LiAlH_4$ compound G was formed. Treatment of G with $PBr_3$ resulted in the formation of compound H. Conversion of compound H to the desired monomer, I, is accomplished by treatment with potassium thioacetate followed by acidification under aqueous conditions, then $I_2$ addition to result in the desired monomeric compound I. Alternatively, treatment of compound H with 2 equivalents of ammonium thiocyanate under acidic conditions in the presence of an oxidizing agent, $I_2$, also resulted in formation of compound I. The same compound I was also formed by adding 2 equivalents of $HS^-$ and an oxidizing agent to compound H. Polymerization of compound I was accomplished in the presence of $FeCl_3$.

Experimental:

2,2'-thiobisacetate ethyl ester. $Na_2S.9H_2O$ (14 g, 58 mmol) was dissolved in an $EtOH/H_2O$ (60 mL/36 mL) solution. Ethyl bromoacetate was added. This was heated at 80° C. for 19 h under N, with an oil bath. Upon cooling to ambient temperature EtOH was removed in vacuo leaving a turbid aqueous solution. Washed with $Et_2O$ (2×40 mL), dried the $Et_2O$ layer with $MgSO_4$. The $Et_2O$ was evaporated under vacuum and the remaining solution was distilled to yield 4.66 g (39%) of a yellow oil. $^1H$ NMR ($C_6d_6$, 400 MHz 23° C.): δ 3.87 (q, 2H, $OCH_2CH_3$). 3.15 (s. 2H: $SCH_2$). 0.90 (t, 3H. $OCH_2CH_3$).

2,5-dicarbethoxy-3,4-dihydroxythiophene. Diethyl oxalate (6.58 g. 45 mmol) was added to 2.2° thiobisacetate ethyl ester (4.66 g. 23 mmol) to produce a yellow-orange solution. A solution of Na (1.56 g, 68 mmol) in EtOH (24 mL) was added to produce a white/yellow precipitate, this was mixed well for 10 minutes. H$_2$O (50 mL) was added to the reaction mass with cooling in an ice bath. Concentrated HCl was added dropwise until acidified. This was allowed to stand in the refrigerator for 12 days. At this point a cold filtration was done to isolate a white solid.

2,5-dicarboxy-3,4-dihydroxythiophene. EtOH (30 mL) was added to 2,5-dicarbethoxy-3,4-dihydroxythiophene (1 g). A solution of NaOH (4.0 g) in H$_2$O (20 mL) was added and refluxed under N for 20 h. Upon cooling to ambient temperature the EtOH was removed by distillation and the residue was redissolved in H$_2$O then acidified with 15% HClaq when a white ppt was obtained This product was collected by filtration and washed with cold H$_2$O then crystallized from dilute MeOH to give colorless needles.

3,4-dihydroxythiophene. The acid, 2,5-dicarboxy-3,4-dihydroxythiophene (1 g), was sublimed in a sublimation tube at 120° C./3 mm. The yellowish decarboxylated product was resublimed and then crystallized from benzene and ligroin to give pale yellow needles.

Cyclic sulfate ethyl ester. Carbon tetrachloride (25 mL) was added to diethyl-L-tartrate (4.3 mL. 25 mmol). Thionyl chloride (3.57 g. 30 mmol) was added via syringe slowly and the solution was refluxed for 50 min. then cooled in an ice bath and diluted with CH$_3$CN (25 mL). RuCl$_3$3H$_2$O (8 mg, 0.03 mmol) and H$_2$O (38 mL) were added, followed by NaIO$_4$ (16 g, 75 mmol). The mixture was stirred at room temperature for 17 h. The mixture was then diluted with 200 mL Et$_2$O and the two phases were separated. The organic layer was washed with H$_2$O (10 mL), saturated NaHCO$_3$ (2×20 mL), and brine (10 mL). After drying over MgSO$_4$, the solution was filtered through a small pad of silica gel. The filtrate was then concentrated to yield analytically pure colorless crystals.

EXAMPLE 2

Figure 2:
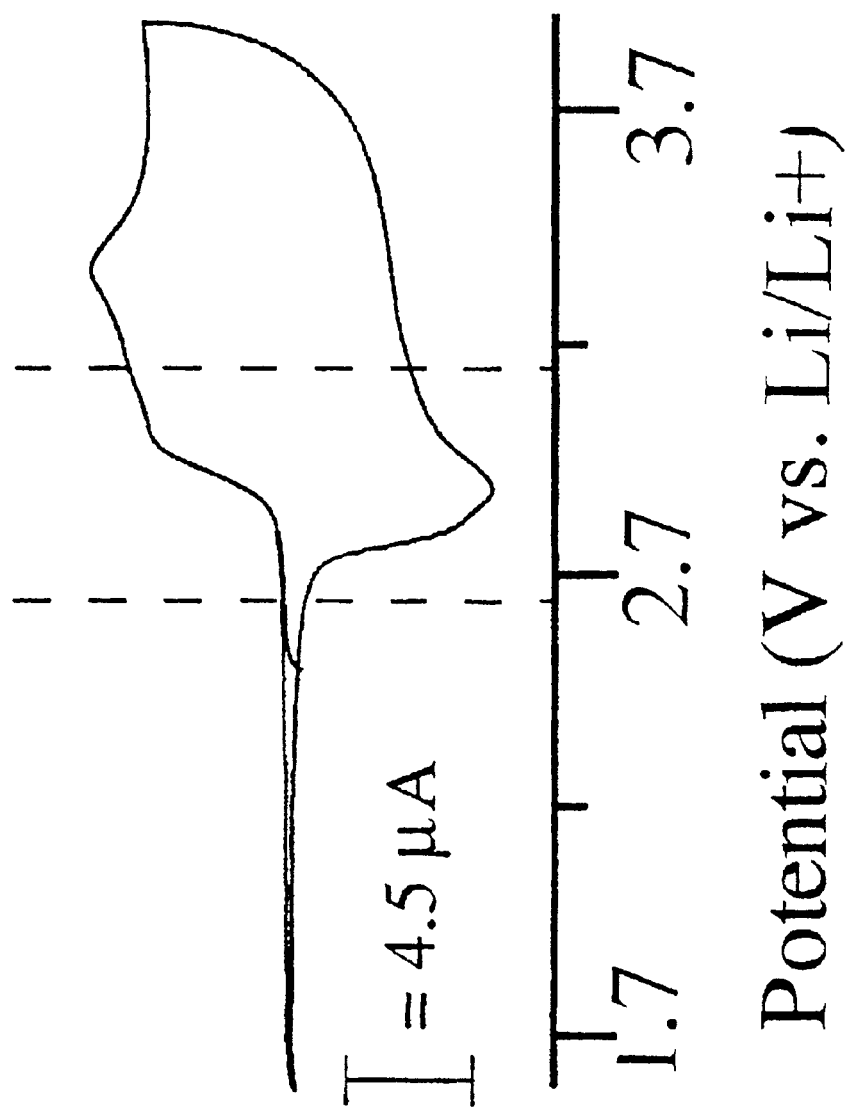
FIG. 2 shows an example of an inappropriate overlap of thermodynamic potentials between polyaniline and an organosulfur.

The use of 3,4-dihydroxythiophene is also necessary in the synthesis of the second desired monomeric component shown in FIG. 2 and will be synthsized as described above. Scheme 4 shows the mechanism of formation of the compound shown in FIG. 2. The reaction of 3,4-dihydroxythiophene with 2,2-dimehtyl-1,3-dioxolane-4-methanol in the presence of a base, followed by H$_3$O$^+$ addition, resulted in the formation of compound K. Alternatively, this is also formed by the addition of 2 equivalents of allyl bromide to 3,4-dihydroxythiophene in the presence of a base. The resulting product, J, was treated with catalytic amounts of OsO$_4$ and sodium periodate to produce compound K. Once compound K was obtained it was treated with PBr$_3$ or tosyl chloride to form L, where LG=Br or OTs. Compound L can also be produced by the addition of 1,2,3-tribromopropane to 3,4-dihydroxythiophene. Treatment of L with potassium thioacetate resulted in formation of M. Polymerization of this material was done in the cathode assembly step followed by removal the thioacetate protecting groups during curing of the cathode, through the use of lithium hydroxide. Alternatively, compound N can be reached directly by treating compound L with HS and an oxidizing agent. At this point polymerization of N was accomplished electrochemically.

Experimental:

2,2'-thiobisacetate ethyl ester. Na$_2$S.9H$_2$O (14 g. 58 mmol) was dissolved in an EtOH/H$_2$O (60 mL/36 mL) solution. Ethyl bromoacetate was added. This was heated at 80° C. for 19 h under N$_2$ with an oil bath. Upon cooling to ambient temperature EtOH was removed in vacuo leaving a turbid aqueous solution. Washed with Et$_2$O (2×40 mL), dried the Et$_2$O layer with MgSO$_4$. The Et$_2$O was evaporated under vacuum and the remaining solution was distilled to yield 4.66 g (39%) of a yellow oil. $^1$H NMR (C$_6$d$_6$, 400 MHz. 23° C.): a 3.87 (q, 2H: OCH$_2$CH$_3$), 3.15 (s, 2H; SCH$_2$). 0.90 (t, 3H. OCH$_2$CH$_3$).

2,5-dicarbethoxy-3,4-dihydroxythiophene. Diethyl oxalate (6.58 g, 45 mmol) was added to 2,2' thiobisacetate ethyl ester (4.66 g. 23 mmol) to produce a yellow-orange solution. A solution of Na (1.56 g, 68 mmol) in EtOH (24 mL) was added to produce a white/yellow precipitate, this was mixed well for 10 minutes. H$_2$O (50 mL) was added to the reaction mass with cooling in an ice bath. Concentrated HCl was added dropwise until acidified. This was allowed to stand in the refrigerator for 12 days. At this point a cold filtration was done to isolate a white solid.

2,5-dicarboxy-3,4-dihydroxythiophene. EtOH (30 mL) was added to 2,5-dicarbethoxy-3,4-dihydroxythiophene (1 g). A solution of NaOH (4.0 g) in H$_2$O (20 mL) was added Scheme 2

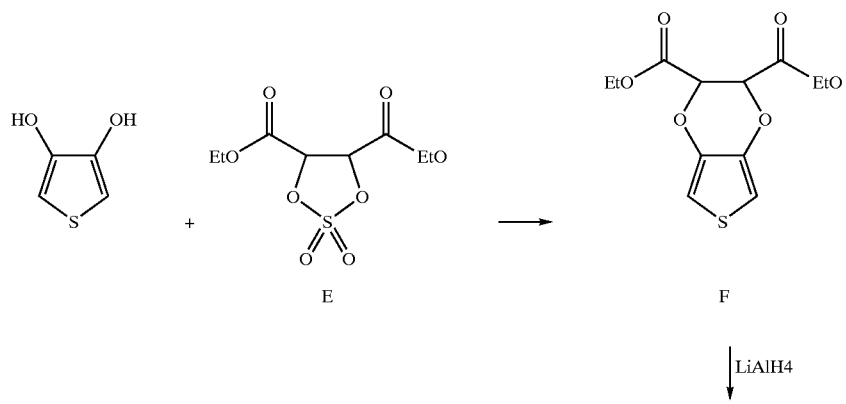

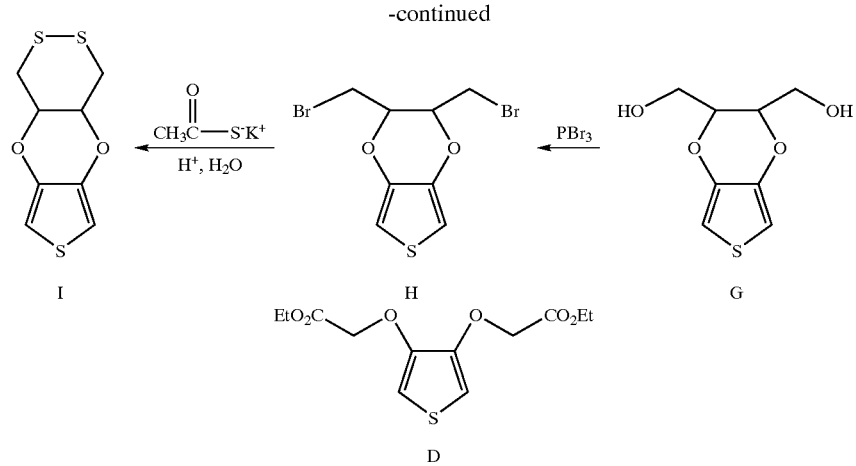
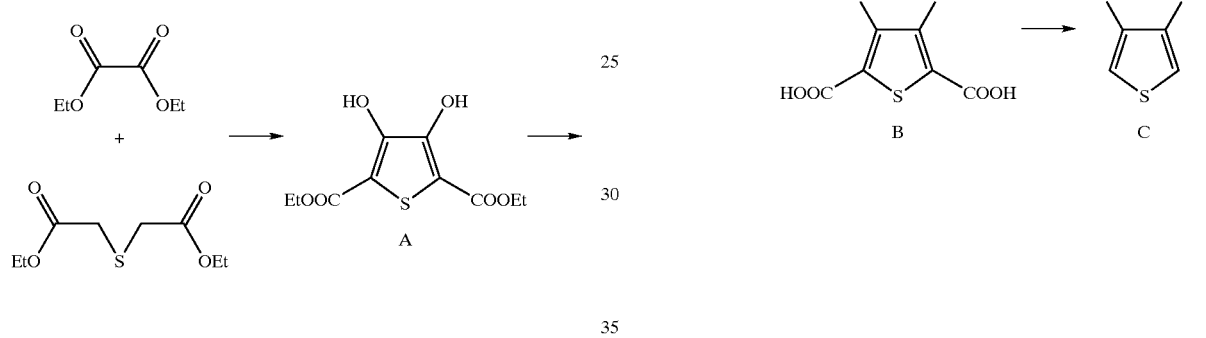
Scheme 3
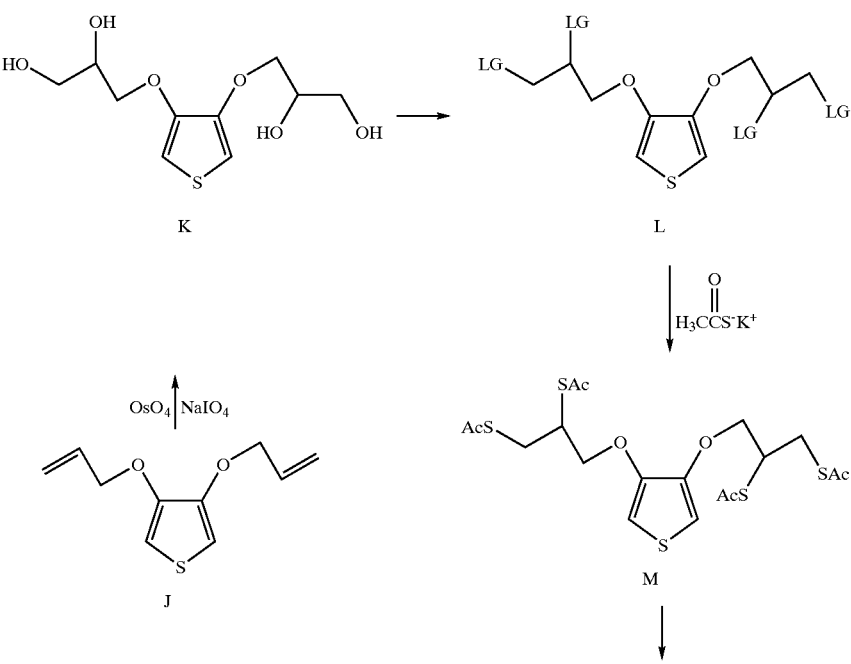
Scheme 4

-continued

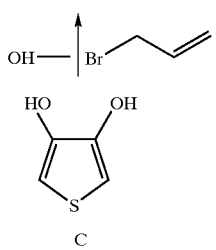

C

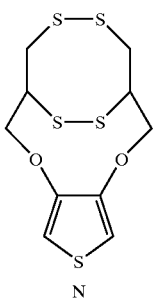

N and refluxed under $N_2$ for 20 h. Upon cooling to ambient temperature the EtOH was removed by distillation and the residue was redissolved in $H_2O$ then acidified with 15% HClaq when a white precipitate was obtained. This product was collected by filtration and washed with cold $H_2O$ then crystallized from dilute MeOH to give colorless needles. 3,4-dihydroxythiophene. The acid, 2,5-dicarboxy-3,4-dihydroxythiophene (1 g), was sublimed in a sublimation tube at 120° C./3 mm. The yellowish decarboxylated product was resublimed and then crystallized from benzene and ligroin to give pale yellow needles.

What is claimed is:

1. A cathode material for use in a sulfur-based Lithium battery comprising a sulfur species and a conducting polymer;

wherein the conducting polymer and the sulfur species exhibit at least one characteristic selected from one of:

ionically conductive for $Li^+$ ions;

charge capacity above 230 Ah/kg;

substantial overlap of thermodynamic potentials of the sulfur species and the conducting polymer;

electronic conductivity above $10^{-4}$ S/cm of the cathode materials;

no solubility in electrolyte solutions; and a capacity fade of less than 10% when the cathode material is cycled 100 times;

wherein the conducting polymer and sulfur species is represented by:

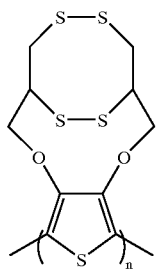

where n is an integer greater than 20.

2. The cathode material according to claim 1, wherein the at least one characteristic includes all of the characteristics of:

ionically conductive for $Li^+$ ions;

inherent charge capacity above 230 Ah/kg;

substantial overlap of thermodynamic potentials of the sulfur species and the conducting polymer;

electronic conductivity above $10^{-4}$ S/cm of the cathode materials;

no solubility in electrolyte solutions; and a capacity fade of less than 10% when the cathode material is cycled 100 times.

3. The cathode material according to claim 1, wherein the at least one characteristic is substantial overlap of thermodynamic potentials of the sulfur species and the conducting polymer.

4. The cathode material according to claim 1, wherein the at least one characteristic is substantial overlap of thermodynamic potentials of the sulfur species and the conducting polymer and no solubility in electrolyte solutions.

5. The cathode material according to claim 1, wherein n is greater than 1000.

6. The cathode material according to claim 5, wherein n is greater than 100,000.

7. A cathode material for use in a sulfur-based Lithium battery containing an electrolyte comprising, a sulfur species and a conducting polymer, wherein the conducting polymer is a single component sulfur-based conducting polymer with the sulfur species covalently linked to the conducting polymer, represented by:

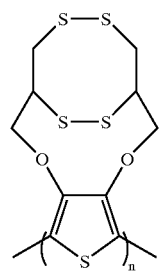

where n is an integer greater than 20.

8. The cathode material according to claim 7, wherein the covalent link of the sulfur species and the conducting polymer provides suitable fade characteristics by not allowing the sulfur species to be soluble in the electrolyte.

9. The cathode material according to claim 7, wherein the battery contains no other sulfur or other sulfur species except for the linked sulfur species.

10. An electric current producing cell comprising:

an anode;

a cathode containing a cathode material of claim 7; and an electrolyte between the anode and cathode.

11. The cathode material according to claim 7, wherein n is greater than 1000.

12. The cathode material according to claim 11, wherein n is greater than 100,000.

13. A cathode material for use in a sulfur-based Lithium battery containing an electrolyte comprising, a sulfur species including sulfide components and a conducting polymer, wherein the conducting polymer is a single component sulfur-based conducting polymer; and wherein physical constraints of the conducting polymer and the sulfide components are provided via covalent bonds which are present regardless of charge state of the cathode material;

and the conducting polymer and sulfide components are represented by:

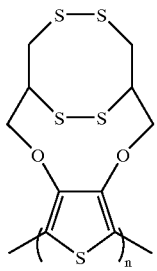

where n is an integer greater than 20.

14. An electric current producing cell comprising:
an anode;
a cathode containing a cathode material of claim 13; and
an electrolyte between the anode and cathode.

15. The cathode material according to claim 13, wherein n is greater than 1000.

16. The cathode material according to claim 15, wherein n is greater than 100,000.

17. Ant electric current producing cell comprising:
an anode;
a cathode containing a cathode material; and
an electrolyte between the anode and cathode;
wherein the cathode material includes a conduction polymer and a sulfur species which exhibit characteristics of:

ionically conductive for $Li^+$ ions;

inherent charge capacity above 230 Ah/kg;

substantial overlap of thermodynamic potentials of the sulfur species and the conducting polymer;

electronic conductivity above $10^{-4}$ S/cm of the cathode materials;

no solubility in electrolyte solutions; and a capacity fade of less than 10% when the cathode material is cycled 100 times;

and the conduction polymer and sulfur species is represented by:

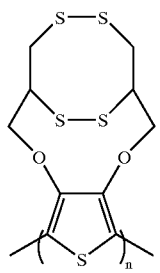

where n is an integer greater than 20.

18. The cathode material according to claim 17, wherein n is greater than 1000.

19. The cathode material according to claim 18, wherein n is greater than 100,000.

* * * * *